United States Patent [19]
Brewer

[11] 3,984,698
[45] Oct. 5, 1976

[54] WATERWHEEL DRIVEN ELECTRICAL GENERATOR

[76] Inventor: Jack J. Brewer, 5012 Oak Timbers Court, Grapevine, Tex. 76051

[22] Filed: Apr. 4, 1975

[21] Appl. No.: 565,067

[52] U.S. Cl. .................................. 290/54; 290/43; 60/639
[51] Int. Cl.² ....................................... F02B 13/105
[58] Field of Search .............................. 290/42–44, 290/53–55; 60/639

[56] References Cited
UNITED STATES PATENTS

| | | | |
|---|---|---|---|
| 1,054,710 | 3/1913 | Olson | 60/639 |
| 1,315,595 | 9/1919 | Clark | 290/44 |
| 3,887,817 | 6/1975 | Steelman | 290/43 |
| 3,927,330 | 12/1975 | Skorupinski | 290/54 |
| 3,928,771 | 12/1975 | Straumsnes | 290/42 |

Primary Examiner—Robert S. Macon
Attorney, Agent, or Firm—H. Mathews Garland

[57] ABSTRACT

An electrical generator system including a waterwheel apparatus as a prime mover. The waterwheel apparatus as a plurality of pivoted buckets mounted in circumferentially spaced relation around a central hub and having an outer rim provided with a ring gear driving a pinion gear on the generator shaft for obtaining a high rotational speed in a generator from a relatively slow turning waterwheel. The waterwheel buckets each fold outwardly to hold a maximum quantity of water as the bucket reaches approximately the horizontal center line of the wheel on the downwardly moving side of the wheel while each bucket empties at the vertical center line of the wheel as the bucket passes the bottom side and thereafter folds inwardly as the bucket moves upwardly and over the top of the wheel.

4 Claims, 7 Drawing Figures

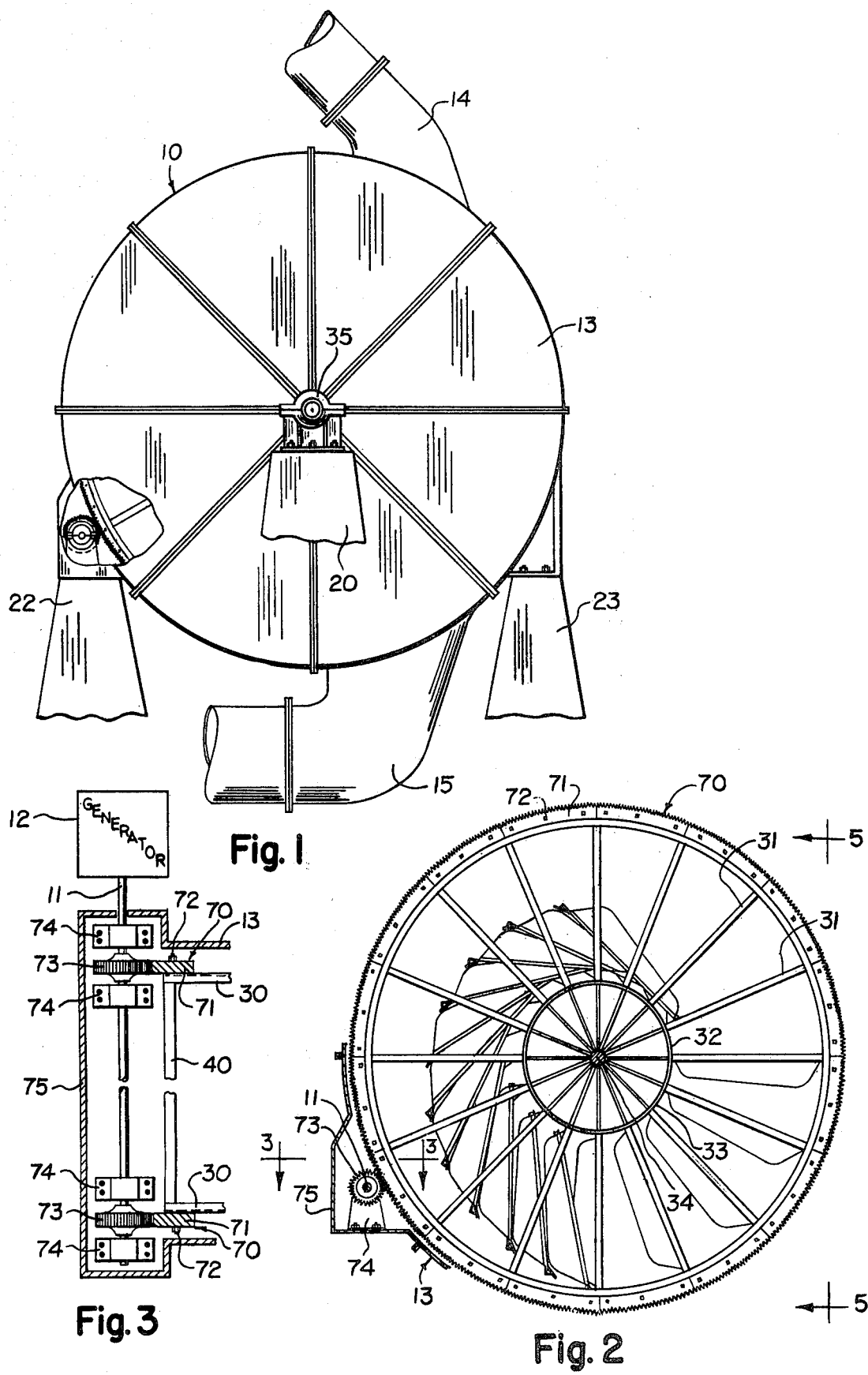

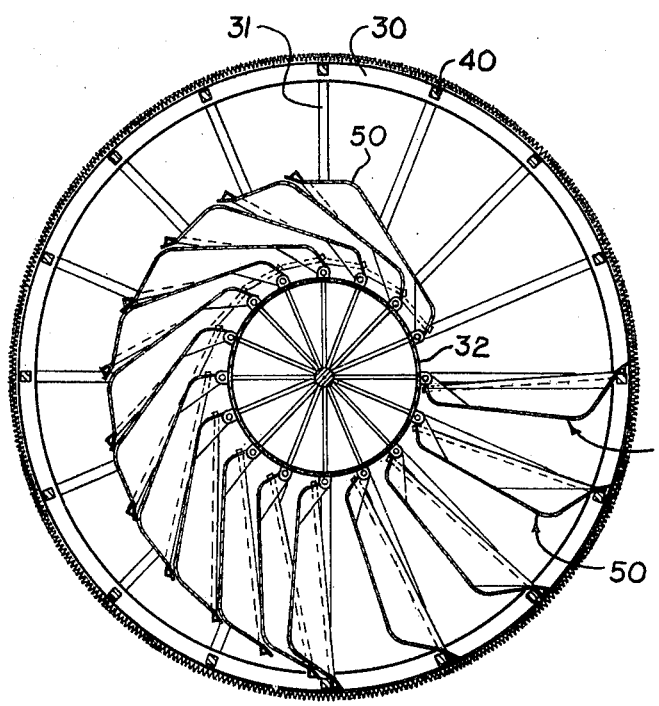
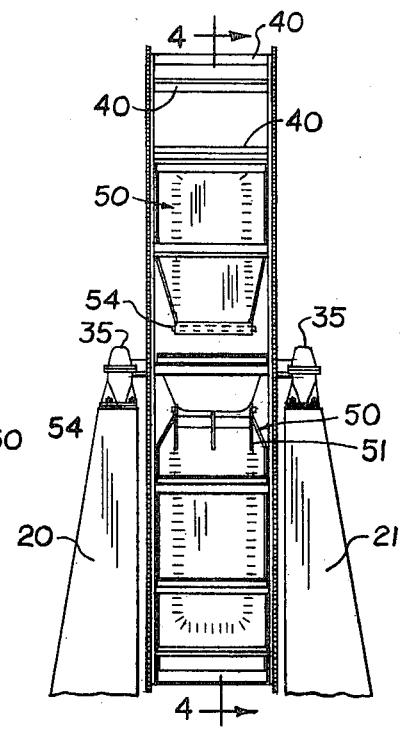
Fig. 4     Fig. 5
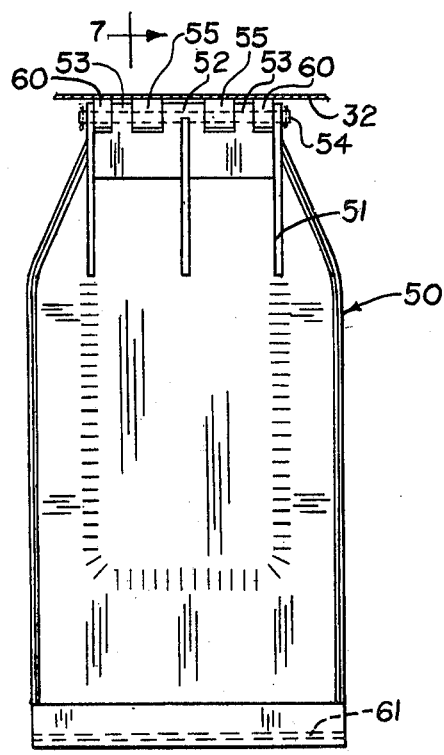
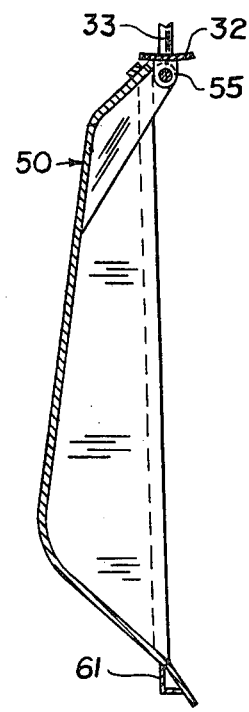
Fig. 6     Fig. 7

WATERWHEEL DRIVEN ELECTRICAL GENERATOR

This invention relates to electrical generator systems and more particularly relates to a water powered electrical generator system utilizing a waterwheel as a prime mover.

Recent worldwide developments have created critical conditions in both the areas of available energy particularly of the fossil fuel type and in air pollution particularly in congested areas. Numerous solutions are being sought to both the air pollution and energy shortage problems. While water power has been used to drive generators it has generally involved the employment of turbines which require a substantial head or drop of the water to generate significant amounts of power. As a result most hydroelectric plants are found in mountainous areas and those areas where very deep lakes can be built to provide the necessary drop in the water flow to drive the turbines. Satisfactory hydroelectric systems using river and stream flow where the water fall is only slight are not known to presently exist.

It is a principal object of the invention to provide a new and improved electrical generation system.

It is another object of the invention to provide a new and improved water powered electrical generation system.

It is a still further object of the invention to provide waterwheel apparatus which may be used to drive an electrical generator.

It is a still further object of the invention to provide a waterwheel type prime mover for a generator which requires minimum head or water fall to power the system.

It is still another object of the invention to provide an electrical generation system using waterwheel having a peripheral gear driving a pinion gear connected with a generator drive shaft.

It is a still further object of the invention to provide a waterwheel for driving a generator which utilizes folding buckets which fold outwardly to receive water for driving the wheel on the downturning side of the wheel and fold upwardly closely around the wheel up on the upturning side of the wheel.

In accordance with the invention there is provided an electrical generation system which includes a waterwheel type prime mover having a plurality of pivoted buckets mounted on a central hub and an outer rim provided with an annular gear which meshes with a pinion gear on the drive shaft of a generator. The wheel is confined within a housing having an inlet and an outlet whereby all water directed to the wheel engages the wheel buckets for rotating the wheel.

The foregoing objects and advantages of the invention will be apparent from the following detailed description of a preferred embodiment thereof taken in conjunction with the accompanying drawings wherein:

FIG. 1 is a fragmentary side view in elevation of a waterwheel apparatus constructed in accordance with the invention;

FIG. 2 is a fragmentary side view in elevation showing the wheel shaped framework of the waterwheel apparatus together with the gear drive arrangement;

FIG. 3 is a fragmentary view in section taken along the line 3—3 of FIG. 2 illustrating the gear drive arrangement of the waterwheel apparatus;

FIG. 4 is a side view in elevation and section showing the water buckets and a portion of the framework of the waterwheel apparatus;

FIG. 5 is a fragmentary view in elevation of the complete waterwheel and the mounting means therefor with the housing removed;

FIG. 6 is an enlarged top view in elevation of one of the water buckets of the waterwheel; and FIG. 7 is a view in section and elevation along the line 7—7 of FIG. 6.

Referring to the drawings, a system for generating electricity embodying the features of the invention includes a waterwheel 10 which is gear connected with a generator shaft 11 leading to a generator 12. The waterwheel apparatus includes a housing 13 having a water inlet 14 and a water discharge 15. The housing is mounted on four vertical support columns 20, 21, 22, and 23.

The waterwheel assembly 10 includes a pair of spaced parallel circular rims 30 mounted on circumferentially spaced radial spokes 31 which are connected at inward ends to a cylindrical hub 32. The hub is mounted on a plurality of circumferentially spaced radial spokes 33 connected with an axle 34. The axle is supported as shown in FIGS. 1 and 5 at opposite ends on pillow block bearings 35 mounted on the towers 20 and 21. The rims 30 are connected together by circumferentially spaced lateral members 40 which are aligned parallel with the axle 34 and positioned around the wheel at the outer ends of each of the sets of spokes 31.

A plurality of water buckets 50 are pivoted at inward ends from the hub 32 and circumferentially spaced around the hub as illustrated in FIG. 4. Each of the buckets has three spaced mounting brackets 51 which are provided with integral laterally spaced sleeve portions 52 and 53 which receive a pivot pin 54 extending through similar sleeve or hinge portions 55 and 60 formed on the hub 32. The pins 54 which hinge the inward ends of the buckets are aligned parallel with the wheel axle 34. The outer end of each of the buckets has a lateral angle member 61 which is engageable with the end stop 40 in the wheel around the wheel rims aligned with the pin 54 for each of the buckets as evident in FIG. 4. Thus when gravity causes each bucket to pivot fully outwardly as indicated in FIG. 4, the bucket is supported between the pin 54 at the inward end of the bucket and the stop 40 between the wheel rims at the outward end of the bucket. Each of the buckets is shaped as best seen in FIG. 7 so that the greater portion of the water in the bucket is positioned toward the outer end of the bucket as the wheel rotates to apply maximum torque to the wheel and retain water in the wheel as long as possible as the wheel rotates responsive to the weight of the water being discharged into the buckets.

An annular peripheral externally toothed gear 70 is mounted around the outer face of each of the wheel rims 30. Each of the peripheral gears 70 is made up of a plurality of identical circular segments 71 which are held by bolts 72 to the outer face of each of the rims. Each of the peripheral gears 70 meshes with a pinion gear 73 mounted on the generator drive shaft 11. The drive shaft is supported on spaced pillow block bearings 74 positioned on opposite sides of pinion gears as seen in FIG. 3. The pinion gears and pillow block bearings on the generator drive shaft are protected by a housing section 75 mounted on the support columns 22 connecting with the waterwheel housing 13. The waterwheel along with the peripheral gears on the wheel and the pinion gears 73 are relatively proportioned and sized to provide 3600 R.P.M. on the generator drive shaft 11 with each 100 R.P.M. of the waterwheel.

The number of buckets 50 used in the waterwheel is limited only by the number which will nest together in the folded position around the wheel as illustrated around the left and upper portions of the wheel shown in FIG. 4. The buckets are tapered as illustrated to a shape which permits them to fit together in an overlying nested relationship also contributing to increasing the number of buckets which may be used in a single wheel.

The waterwheel system is placed in a location where a flowing stream or river may be diverted at least in part to supply water into the input line 14. The system is basically designed to generate the desired output in response to the dead weight of the water rather than a hydrostatic head of great height and velocity. Under some conditions the water may be pumped to an elevation sufficient to introduce it into the input 14.

Water being supplied to the waterwheel system 10 enters the housing 13 through the inlet 14 which directs the water into the wheel substantially across the bottom of the forwardmost folded bucket 50 as seen in FIG. 4. The water enters the next advancing bucket 50 which is folded outwardly to a substantially horizontal position so that the water fills the bucket providing a rotating force of a magnitude dependent upon the volume of water in the bucket, the weight of the bucket, and the moment arm between the wheel shaft 34 and the filled bucket. The wheel rotates clockwise as seen in FIG. 4 with the water spilling downwardly and outwardly into the housing as the bucket moves downwardly around in the housing with the turning of the wheel until the bucket arrives at the vertical position as seen in the bottom center of FIG. 4 at which position the bucket will be fully emptied. By the time the first filled bucket reaches the second position as viewed clockwise in FIG. 4 the next bucket will have fallen to the horizontal position and be filled with the incoming water. Thus the buckets sequentially drop to the position to be filled as the wheel turns clockwise. As each bucket is completely emptied it of course is moving upwardly around the left side of the wheel as seen in FIG. 4 into a closely nested relationship with the next succeeding bucket toward which it is advancing so that the buckets fold inwardly as illustrated. The discharge conduit 15 is positioned to permit the water emptying from the rotating buckets to flow from the housing 13 at a rate consistent with the input to the housing through the conduit 14 so that there is no backup of water within the housing. The rate of flow into the housing through the conduit 14 is suitably controlled by any desirable means to control the speed of rotation of the waterwheel at the rate required to obtain the rotational speed needed for the generator.

The waterwheel units may be made of any size desired to obtain a given output and may be connected together in tandem if conditions permit and the requirement for power so dictates. The system provides a ready means for power generation which effects no water loss, no pollution, and requires no substantial head as is necessary in conventional hydroelectric plants.

What is claimed is:

1. A water driven power generation system comprising: a waterwheel having a plurality of water containing buckets for turning said wheel responsive to water discharge into each of said buckets; water input means leading to said waterwheel; water discharge means leading from said waterwheel; peripheral gear means secured around said waterwheel; a pinion gear meshing with said peripheral gear means; and an electrical generator having a drive shaft connected with said pinion gear.

2. A power generation system in accordance with claim 1 wherein each of said buckets on said waterwheel is pivoted along an inward end portion so that said bucket folds outwardly to receive water when moving downwardly around said wheel and folds inwardly when empty and moving upwardly around said wheel.

3. An electrical power generation system in accordance with claim 2 wherein each of said buckets is of a tapered configuration to permit a plurality of said buckets to nest closely one with the other as said buckets move upwardly in an empty condition around said wheel.

4. A power generation system in accordance with claim 3 including a housing enclosing said waterwheel confining the flow of water closely around said buckets between said input and said discharge.

* * * * *

UNITED STATES PATENT OFFICE
CERTIFICATE OF CORRECTION

Patent No. 3,984,698             Dated October 5, 1976

Inventor(s) Jack J. Brewer

It is certified that error appears in the above-identified patent and that said Letters Patent are hereby corrected as shown below:

Abstract, line 3, "as" should read "has".

Signed and Sealed this

Fourteenth Day of December 1976

[SEAL]

Attest:

RUTH C. MASON
*Attesting Officer*

C. MARSHALL DANN
*Commissioner of Patents and Trademarks*